US012629957B2

(12) United States Patent
Deichsel et al.

(10) Patent No.: US 12,629,957 B2
(45) **Date of Patent: *May 19, 2026**

(54) SECURITY FEATURE AND METHOD FOR THE DETECTION THEREOF AND SECURITY OR VALUE DOCUMENT

(71) Applicant: Bundesdruckerei GmbH, Berlin (DE)

(72) Inventors: Andreas Deichsel, Berlin (DE); Lazar Kulikovsky, Berlin (DE); Florian Peters, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 165 days.

This patent is subject to a terminal disclaimer.

(21) Appl. No.: 18/292,201

(22) PCT Filed: Jul. 15, 2022

(86) PCT No.: PCT/DE2022/100509
§ 371 (c)(1),
(2) Date: Jan. 25, 2024

(87) PCT Pub. No.: WO2023/006142
PCT Pub. Date: Feb. 2, 2023

(65) Prior Publication Data

US 2024/0367454 A1 Nov. 7, 2024

(30) Foreign Application Priority Data

Jul. 27, 2021 (DE) ..................... 10 2021 119 436.9

(51) Int. Cl.
*B42D 25/387* (2014.01)
*B42D 25/373* (2014.01)
*G07D 7/1205* (2016.01)

(52) U.S. Cl.
CPC ......... *B42D 25/387* (2014.10); *B42D 25/373* (2014.10); *G07D 7/1205* (2017.05); *G07D 2207/00* (2013.01)

(58) Field of Classification Search
CPC .... B42D 25/387; B42D 25/29; B42D 25/382; G07D 7/1205; G07D 7/205; C09K 11/584
(Continued)

(56) References Cited

U.S. PATENT DOCUMENTS 4,446,204 A * 5/1984 Kaule .................... B41M 3/144
428/323
10,328,738 B2 * 6/2019 Machizaud ............ D21H 21/44
(Continued)

FOREIGN PATENT DOCUMENTS

DE 10326644 A1 1/2005
DE 102013114496 A1 6/2015
(Continued)

OTHER PUBLICATIONS

International Search Report of the International Searching Authority, issued in PCT/DE2022/100509, mailed Nov. 2, 2022; ISA/EP.
(Continued)

*Primary Examiner* — Daniel St Cyr
(74) *Attorney, Agent, or Firm* — Harness, Dickey & Pierce, P.L.C.

(57) ABSTRACT

The invention relates to a security feature for a security and/or value document which comprises a mixture of electrically conductive field displacement elements which are electrically insulated within the security or value document, and a zinc sulfide luminophore in the form of particles, which mixture is applied to a security and/or value document by means of a printing technology. The zinc sulfide luminophore has the general chemical formula ZnS: $Cu_x$, $M_y$, $X_z$. Here, M represents one or more elements from a
(Continued)

Figure 1:
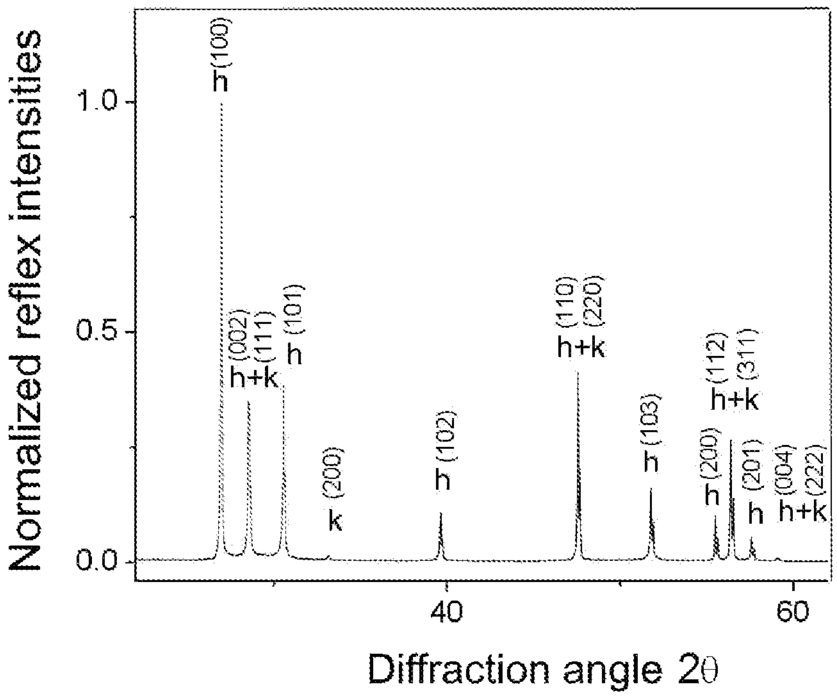

group comprising the chemical elements Co, In and Ni; X represents one or more elements from a group comprising the halides F, Cl, Br and I; $0<x\leq 0.002$; $0<y\leq 0.00015$; and $0\leq z\leq 0.00050$. The particles each have cubic phase fractions and hexagonal phase fractions, the zinc sulfide luminophore emitting a first luminescent radiation in the spectral range between 580 nm and 780 nm in the event of excitation by an electrical field, and the zinc sulfide luminophore emitting a second luminescent radiation in the visible spectral range in the event of thermal stimulation and preceding excitation by means of UV radiation. Furthermore, a security and/or value document having a security feature and a method for detection and/or verification of a security feature having a luminophore are provided.

16 Claims, 5 Drawing Sheets

(58) Field of Classification Search
USPC .......................................................... 235/491
See application file for complete search history.

(56) References Cited

U.S. PATENT DOCUMENTS

| | | | | |
|---|---|---|---|---|
| 11,887,427 | B2 * | 1/2024 | Shortell | B42D 25/387 |
| 12,017,471 | B2 * | 6/2024 | Starick | B42D 25/382 |
| 2007/0199999 | A1 | 8/2007 | Bailleu et al. | |
| 2011/0087440 | A1 * | 4/2011 | Lau | B42D 25/373<br>252/62.51 R |
| 2011/0297039 | A1 | 12/2011 | Krietsch et al. | |
| 2016/0312115 | A1 | 10/2016 | Starick et al. | |

FOREIGN PATENT DOCUMENTS

| | | | |
|---|---|---|---|
| DE | 102020111461 | B3 | 9/2021 |
| WO | WO-2005115766 | A1 | 12/2005 |
| WO | WO-2021219568 | A1 | 11/2021 |

OTHER PUBLICATIONS

Search Report received in German counterpart application No. 102021119436.9, dated Oct. 25, 2021.

* cited by examiner

SECURITY FEATURE AND METHOD FOR THE DETECTION THEREOF AND SECURITY OR VALUE DOCUMENT

CROSS-REFERENCE TO RELATED APPLICATIONS

This application is a 371 U.S. National Phase of International Application No. PCT/DE2022/100509, filed on Jul. 15, 2022, which claims priority to German Patent Application No. 10 2021 119 436.9, filed Jul. 27, 2021. The entire disclosures of the above applications are incorporated herein by reference.

The present invention first relates to a security feature for a security document or document of value (value document). The security feature comprises a zinc-sulphidic luminophore which on the one hand emits in the deep red spectral range as an electroluminophore and on the other hand shows a further luminescence behaviour. The invention further relates to a security document and document of value, which may for example be a banknote or a passport, an identity card, a driving licence or a postage stamp. The invention additionally relates to a method for detecting and/or verifying the security feature according to the invention.

BACKGROUND

Zinc-sulphidic luminophores count among the longest known and globally best investigated luminophores. They may have very different luminescence properties, depending on the actual material composition and the details of the synthesis of the luminophore, so a wide range of applications in different technical fields result. ZnS luminophores have found use both as efficient photoluminophores (PL), as cathodoluminophores (CRT) for black and white and colour picture tubes, as afterglow pigments (Afterglow) and as electroluminophores for thin film (TFEL) and thick film (AC powder electroluminescence, ACPEL) films or displays.

The powdered ZnS luminophores which are capable of electroluminescence are for the most part doped with copper (Cu) and/or manganese (Mn) and furthermore for the most part contain further mono-or trivalent ions which function as coactivators, for example those of the elements Cl, Br, I and/or Al, which can likewise be incorporated into the ZnS matrix. They luminesce when excited with electric AC voltage, preferably in the blue, green or orange-coloured spectral range, wherein, according to references, these luminophores for the most part have a preferably cubic crystalline structure (cf. SHIONOYA, S.; YEN, W. M.: Phosphor Handbook. Boca Raton, FL: CRC Press, 1999. pp. 581-621.—ISBN 0-8493-7560-6).

In the technical literature, multistage preparation methods are proposed for producing conventional zinc-sulphidic electroluminophores for ACPEL applications, which methods can be modified in different ways. Modifications of this type also relate for example to the methods of synthesis which are proposed for the production of fine-grained and therefore printable electroluminescent ZnS powders, which are described extensively in the patent specifications EP 1 151 057 B1 and EP 3 083 882 B1. In principle, the methods for producing effective zinc-sulphidic EL pigments are characterized by the process steps listed in the following:

1. Intensive mixing of the starting substances to form a mixture of greatest possible homogeneity,
2. Annealing the mixture at temperatures between 800° C. and 1,300° C. in a selected annealing atmosphere (air or nitrogen or nitrogen with a hydrogen content of up to 10%),
3. Grinding the annealing material and washing with $H_2O$ and/or optional etching using dilute mineral acids,
4. Redoping the annealing material with a certain quantity of a suitable Cu source,
5. Renewed annealing (tempering) of the dried material mixture at temperatures between 200° C. and 900° C.
6. Renewed grinding and washing of the annealing material, treating the annealing material with mineral acids and/or complexing agents to remove superficially deposited copper sulphides,
7. Subsequent tempering of the zinc-sulphidic luminescent powder at temperatures below 500° C. and screening.

In this case, the steps 3, 4 and 5 are primarily used for generating $Cu_xS$ deposits at lattice defects and displacements of the zinc sulphide matrix, which are required according to consensus in the literature for efficient ACPEL electroluminescence of powdered ZnS luminophores.

The conventional technical use of zinc-sulphidic electroluminophores for the most part takes place in the form of what are known as electroluminescent films, in which the luminescent particles are arranged in the sense of a capacitor arrangement between two electrodes and insulating layers. Usually, the excitation of the electroluminescence of EL films of this type takes place with the aid of electric AC fields which have voltages of approximately 110 V and frequencies of approximately 400 Hz.

The zinc-sulphidic luminescent particles used for the production of electroluminescent films of this type are for the most part provided with thin water vapour blocking layers, which for example can consist of $SiO_2$, $TiO_2$, $Al_2O_3$ or else of other suitable materials, for increasing the service life of the films. This coating, which is also termed microencapsulation, can for example take place with the aid of such methods as chemical vapour deposition (CVD). Examples of usage for electroluminescent films or lamps of this type are display backlights, lighting and marking elements, as are used in aircraft and motor vehicles, in buildings or for producing advertising installations.

It was not possible to find any technical applications in the technical literature for zinc-sulphidic electroluminescence luminophores which are doped exclusively with copper and which luminesce in the deep red spectral range with emission maxima between 580 nm and 780 nm. Electroluminescent materials of this type were primarily described in older scientific publications (cf. KRÖGER, F. A.; DIKHOFF, J. A. M.: The Function of Oxygen in Zinc Sulfide Phosphors, in: J. Electrochem. Soc. Vol. 99, 1952. pp. 144-154.—ISSN: 0013-4651; HOOGENSTRAATEN, W.: Electron Traps in Zinc-Sulfide Phosphors, in: Philips Res. Repts, Vol. 13, 1958. pp. 515-693.—ISSN 0031-7918 and also GRASSER, R.; SCHARMANN, A.; WETZEL, G.: Thermolumineszenz von kubischem und hexagonalem ZnS/Cu, in: Z. Naturforsch., Vol. 28a, 1973, No 12, pp. 1378-1379.-ISSN 0932-0784), but for example also in the above-cited "Phosphor Handbook". During the evaluation of this literature, it becomes clear that in relation to the efficiency of this type of electroluminescence and also in relation to the mechanisms and radiation centres responsible, great uncertainties exist as before.

The use of powdered ZnS electroluminophores for forgery protection of security documents and documents of value, such as for example banknotes, passports, identity cards, driving licences, etc., was first described in the patent specification EP 0 964 791 B1. In this case, it was already taken as a starting point in this patent specification to arrange the required zinc-sulphidic electroluminescent pigments on or in the matrix of the respective security documents with the aid of the usual printing technologies, such as for example corresponding gravure, flexographic, offset or screen printing methods, without striving for the conventional, classic capacitor structure. Further investigations resulted in the proof that this is possible and that the authenticity verification of the electroluminophores applied in such a manner onto or into the security documents or documents of value can additionally be achieved by bringing the electric AC field close to the luminescent pigments in a contactless manner (cf. EP 1 059 619 B1, EP 1 149 364 B1 and DE 10 2008 047 636 A1).

However, comparatively high-frequency high voltage AC fields are required in such a case in order to ensure a secure stationary or else advantageously a high speed detection of the resulting luminescence signals. On the other hand, it was also found in this context that due to the combination of suitable EL pigments with what are known as field displacement elements, it is possible to achieve an increase of the local field strength effective on the surface of the luminescent particles and therefore a decrease of the external high voltage which is imposed in a contactless manner. These circumstances are described comprehensively for example in the patent specifications EP 1 631 461 B1 and EP 1 748 903 B1.

A decisive prerequisite for the technical feasibility of printable and securely verifiable electroluminescent security features is to be seen in the availability of correspondingly fine-grained luminophores with high signal strength, high resistance to ageing and preferably exclusive luminescence behaviour. Such suitable powdered electroluminophores are disclosed for example in EP 1 151 057 B1. Methods for producing blue and green emitting EL pigments with exclusively cubic crystalline structure and average grain sizes between 2 μm and 5 μm or 5 μm and 15 μm are presented in this patent specification, the suitability of which for the creation of printed security features it was possible to prove.

Further luminophores which are suitable for the creation by printing of electroluminescent security features are described in EP 3 083 882 B1. In this case, the powdered zinc-sulphidic luminophores mentioned in this patent specification show, in addition to their specific blue electroluminescence, a photoluminescence which is intensive and therefore detectable with the aid of conventional sensors and which is additionally characterized by a characteristic blue-green colour change of the emission when the UV excitation conditions are varied.

SUMMARY

The object of the present invention consists in providing a security feature, which is suitable for a security document or document of value, with a zinc-sulphidic electroluminophore which differs in an exclusive manner from the EL pigments used in different technical fields owing to its special luminescence properties. The object of the invention additionally consists in providing a method for detecting and/or verifying a security feature of this type. Furthermore, a corresponding security document or document of value is to be provided.

The object mentioned is achieved by a security feature according to the appended Claim 1, by a security document or document of value according to the appended coordinate Claim 11 and by a method according to the appended coordinate Claim 12.

In the following, first a few terms are defined as they are understood in the sense of the invention.

The electromagnetic radiation emitted by a physical system during the transition from an excited state to the base state is termed luminescence. Generally, the luminescence relates to the conversion of energy richer to energy poorer radiation (down conversion), wherein the difference between the wavelength of the absorbed radiation and the wavelength of the emitted radiation is termed Stokes shift. Various types of luminescence (for example photoluminescence, cathodoluminescence, x-ray luminescence, electroluminescence, etc.) are differentiated depending on the character of the exciting radiation and the spectral range of the emitted electromagnetic radiation.

Anti-Stokes luminescence (up conversion) is a special case of luminescence, in which following prior, possibly multistage infrared (IR) induced stimulation or excitation, emission takes place in an energy richer spectral range, for example in the range of visible light.

Electroluminescence is a special form of luminescence, in which inorganic or organic solids are excited to emit electromagnetic radiation, for example in the visible spectral range, due to the application of electric DC or AC voltage fields. In the present invention, the term electroluminescence is used exclusively for the luminescence of powdered inorganic luminophores which can be excited with the aid of electric AC fields (AC Powder Electroluminescence, ACPEL).

Luminophores are organic or inorganic chemical compounds which show luminescence phenomena when excited with electromagnetic or particle radiation or following excitation by means of electric fields. To enable this, activator ions and possibly additionally coactivator ions, which act as radiation centres, are incorporated into the fundamental lattices of the luminophore (luminophore matrices), which are formed by the chemical compounds. These luminophores are often formed as solids, particularly in the form of pigments. The electroluminescent luminophores which are described in connection with the present invention are variously also termed electroluminophores or electroluminescent (EL) pigments. The chemical compound zinc sulphide (ZnS) constitutes the fundamental lattice of a luminophore which is used most often for the production of ACPEL pigments.

In principle, two structure types are characteristic for the crystalline structure of the ZnS particles, on the one hand the cubic sphalerite or zinc-blende structure, which is stable below the phase transformation temperature of approximately 1,020° C., and the hexagonal wurtzite structure, which is stable above approximately 1,020° C. On the other hand, the zinc sulphide is however, according to references (cf. WITHNALL, R. et al.: Structure and Morphology of ACEL ZnS:Cu, Cl Phosphor Powder Etched by Hydrochloric Acid, in: J. Electrochem. Soc., Vol. 156, 2009, No 11, pp. J326-J332.—ISSN 0013-4651), clearly to be considered as an outstanding example for the occurrence of polytypic structural modifications which result from the large number of possible stack sequences and from the strong tendency to twin crystal formation. In the literature, it is assumed that the chemical compound zinc sulphide can form more than 185 different polytypes.

The structural status of different ZnS luminophores depends on the actual composition of the materials and on the production conditions (cf.: GOBRECHT, H.;

NELKOWSKI, H.; ALBRECHT, P.: Zur Kristallstruktur der Zinksulfide, in: Z. Naturforsch., Vol. 16a, 1961, No 9, pp. 857-860.—ISSN 0932-0784; WITHNALL, R. et al.: Structure and Morphology of ACEL ZnS: Cu, Cl Phosphor Powder Etched by Hydrochloric Acid, in: J. Electrochem. Soc., Vol. 156, 2009, No 11, pp. J326-J332.—ISSN: 0013-4651 and IRELAND, T. G.; SILVER, J.: Studies on the Orientations of ACEL ZnS:Cu Particles in Applied AC Fields, in: ECS Journal of Solid State Science and Technology, Vol. 3, 2014, pp. R25-R32.—ISSN 2162-8769). In addition to pure phase cubic zinc-sulphidic luminescent powders or pure phase hexagonal luminescent powders, which are somewhat less common, it is also possible, by using the various influential factors, to synthesize ZnS luminophores which have different cubic/hexagonal phase fractions. The exact determination of these phase fractions can be carried out with the aid of suitable x-ray diffractometers (XRD).

The wavelength range of the electromagnetic radiation which is arranged between that of x-ray radiation and that of microwaves is termed optical radiation. It therefore comprises the range of UV radiation, that of visible light and that of infrared radiation and therefore the wave-length range between 100 nm and $10^6$ nm (1 mm).

Ultraviolet (UV) radiation relates to the wavelength range of 100 nm to 380 nm. In this case, a distinction is usually made between what is known as UV-A radiation (380 nm to 315 nm), UV-B radiation (315 nm to 280 nm) and UV-C radiation (280 nm to 100 nm).

Visible light (VIS) is the section of the electromagnetic spectrum which can be perceived by the human eye. For the normal observer, this range comprises the wavelengths between 380 nm and 780 nm.

There are different approaches in the technical literature for classifying the wavelength range of infrared (IR) radiation, which ranges from 780 nm to $10^6$ nm (1 mm). Generally, a distinction is made between near infrared (NIR) (780 nm to 3,000 nm), middle (3,000 nm to 50 μm) and far IR (50 μm to 1 mm), wherein the NIR range is often also divided into the IR-A (780 nm to 1,400 nm) and the IR-B range (1,400 nm to 3,000 nm).

An emission spectrum describes the spectral intensity distribution of the electromagnetic radiation emitted by the luminophores at a fixed excitation wavelength. An emission spectrum of this type may consist of emission lines and/or emission bands.

An excitement spectrum shows the dependence of the intensity of the radiation emitted by a luminophore at a fixed wavelength on the wavelength of the excitation radiation. In this case, the measured intensity is influenced both by the efficiency for the absorption of the excitation radiation and by the efficiency of the radiation conversion.

The occurrence of luminescence phenomena (emission of visible light), which may occur during the heating of a solid, is termed thermoluminescence (thermally stimulated luminescence, TSL). The supply of thermal energy causes the freeing of electrons, which have previously been captured in what are known as lattice traps (traps) after excitation has taken place using electromagnetic or ionizing radiation and which are stored over a relatively long time period, and the radiant return of the electrons to the base state. The graphical illustration of the dependence of the luminescence intensity on the increasing temperature during the heating process is termed a glow curve.

Alternatively to thermal activation, the freeing of the electrons which are captured by certain solids in traps can also be achieved by exciting the materials with an energetically adequate optical radiation. The emission of visible light taking place as a result of an activation of this type is termed optically stimulated luminescence (OSL) in the technical literature.

Primarily in the 1950s to 1970s, numerous investigation results concerning thermoluminescence behaviour of zinc-sulphidic luminophores were published (cf. for example the overviews of HOOGENSTRAATEN, W.: Electron Traps in Zinc-Sulfide Phosphors, in: Philips Res. Repts, Vol. 13, 1958, pp. 515-693.—ISSN 0031-7918 and GRASSER, R.; SCHARMANN, A.; WETZEL, G.: Thermolumineszenz von kubischem und hexagonalem ZnS/Cu, in: Z. Naturforsch., Vol. 28a, 1973, No 12, pp. 1378-1379.—ISSN 0932-0784). In this case however, the academic interest of the authors was preferably the glow peaks occurring at comparatively low temperatures ($T_{max}<273$ K).

The security feature according to the invention is designed to be used in a security document or in a document of value as authenticity criterion. The authenticity of the security document or the document of value can be investigated by means of a detection or verification of the security feature.

The security feature comprises a powdered, zinc-sulphidic luminophore, in which the structure of the individual luminescent particles is in each case characterized by preparatively configured cubic and hexagonal phase fractions and which, in addition to an electroluminescence that can be excited by means of electric AC fields, has further special luminescence properties. In particular, in addition to its electroluminescence, this luminophore also shows a securely detectable exclusive thermoluminescence characteristic, which is explained in more detail below.

The basic idea of the invention consists in the provision of a zinc-sulphidic electroluminophore for use in security features, which, in addition to its efficient electroluminescence that takes place predominantly in the deep red spectral range, is distinguished by further special, verifiable luminescence properties and in addition to electroluminescence in particular shows a thermoluminescence (TSL) which can be detected and distinguished in a stable manner. In this case, it has been shown that an important prerequisite for the occurrence of a first luminescence radiation, namely an efficient electroluminescence in the spectral range between 580 nm and 780 nm, and the simultaneous presence of a second luminescence radiation which is different from the first luminescence radiation, namely a securely verifiable thermally or else optically stimulable luminescence consists in selecting and optimizing the synthesis conditions for the production of the zinc-sulphidic electroluminophore in the form of electroluminescence pigments in such a manner that these pigments have both cubic and hexagonal phase fractions in each case. Only in this manner is it possible to achieve that, in addition to the radiation centres necessary for effective electroluminescence, comparatively deep-lying traps are formed in the exclusive ZnS electroluminophore, which traps are able to store excitatory radiation energies sustainably over a relatively long period of time and which traps are not emptied prematurely by means of what are known as afterglow processes. The thermal stimulation of the energies stored in the form of electrons in the traps then leads to the generation of measurable thermoluminescence signals, wherein the corresponding glow curves preferably have temperature maxima of $T_{max}>100°$ C.

During the investigation of the luminophores suitable for the security features according to the invention, it was furthermore possible to prove experimentally that the electrons stored in the traps of the zinc-sulphidic electroluminophores can also be returned back to the base state by means of the stimulation with suitable optical radiation. On this basis, it is possible, as an alternative to the exclusive thermoluminescence, to also use the likewise exclusive optically stimulable luminescence (OSL) of the same zinc-sulphidic electroluminophores as an authenticity criterion in security features.

Due to the use of the aforementioned effects in the invention, the exclusivity of the security feature according to the invention is increased compared to the prior art and the possibilities for the use thereof are extended. On the basis of the described electroluminescence pigments, it is possible to provide the exclusive security feature according to the invention, which has additional further security-relevant properties which are independent of its level 3 characteristics and can likewise be called upon for testing authenticity. The signals required for a secure verification of these properties may in this case both be forensically determined and read out by machine.

The zinc-sulphidic luminophore which is used in the security feature according to the invention has the following formula:

$$ZnS: Cu_x, M_y, X_z.$$

In this case, Cu represents the chemical element copper, whilst the symbol M represents one or more elements selected from a group comprising the chemical elements cobalt (Co), indium (In) and nickel (Ni). The symbol X represents one or more elements selected from a group comprising the halides fluoride (F), chloride (Cl), bromide (Br) and iodide (I). The following relationships apply in this case for the indices listed:

$$0 < x \leq 0.002$$

$$0 < y \leq 0.00015$$

$$0 \leq z \leq 0.00050$$

In an alternative format, the above-detailed general chemical formula for the zinc-sulphidic luminophore may also be given as:

$$(Zn_{1-x-y-d}\,Cu_x\,M_y\,\Box_d)\,(S_{1-z-e}\,\Box_e\,X_z)$$

wherein the symbol □ labels the lattice voids or interstices which are formed during the synthesis of the luminophore for the purpose of charge compensation and the associated indices d and e label their respective proportions.

In a preferred embodiment of the security feature, the zinc-sulphidic luminophore used has the composition:

$$ZnS: Cu_x, Co_y$$

where $0<x<0.002$ and $0<y\leq 0.00015$.

The described zinc-sulphidic luminophore is distinguished by a high efficiency of the achievable electroluminescence yields and by similarly high thermoluminescence and/or OSL signal strengths. At the same time, it has a high stability and age resistance with respect to environmental influences. Both aspects are of great importance for the secure verifiability of the security feature according to the invention, which is based on the described zinc-sulphidic luminophore, over the entire life cycle of the corresponding security document or document of value.

Depending on the preparative conditions, the particles of the zinc-sulphidic luminophore, which is formed in the form of luminescent powder, preferably have an average grain size of between 2 μm and 50 μm, particularly preferably between 2 μm and 20 μm. On this basis, it is possible to apply these particles onto and/or into the documents of value and security documents using the usual print technologies, such as for example the known gravure, flexographic, offset or screen printing methods or else with the aid of coating and laminating methods of a different kind, in order to form the security feature according to the invention. The relevant documents of value and security documents may be banknotes, identity cards, passports and driving licences, but also for example service cards, such as bank or credit cards, etc.

The emission spectra of the variants of the described zinc-sulphidic luminophore which luminesce with high intensity when excited with electric AC fields preferably consist in each case of only one emission band, the spectral extent of which in total comprises the wavelength range from 480 nm to 880 nm and preferably the wavelength range from 580 to 780 nm. The intensity maxima of these comparatively extremely wide-banded emissions preferably lie in the range from 640 nm to 660 nm. The half widths of the emission bands are preferably between 180 nm and 240 nm.

The authenticity test of the security feature according to the invention, which aims to detect the exclusive electroluminescence, may take place using known methods for verifying electroluminescent features with level 3 characteristics. The exclusive emission of the zinc-sulphidic luminophore, which takes place in the deep red spectral range between 580 and 780 nm, is in this case also to be considered as advantageous because of its good matching with the spectral sensitivity of the silicon (Si) sensors which are usually used for detection. As described in the prior art, due to the combination of the EL pigments with what are known as field displacement elements, the signal strength of the electroluminescence can be increased further in the case of the security feature according to the invention.

In addition to the described exclusive, stationary electroluminescence, the described zinc-sulphidic luminophore, after prior excitation, shows characteristic luminescence phenomena which can be observed and measured during its heating. This special type of luminescence, which is linked to the presence of certain traps in the respective fundamental lattice of a luminophore and is based on the freeing of stored electrons or stored energies in these traps and the return thereof to the base state, is termed thermoluminescence (TSL) in the technical literature. The temperature dependence of the intensity of the light emitted as a consequence of the supply of the thermal energy can be recorded in the form of what are known as glow curves.

The TSL glow curves of the different variants of the described zinc-sulphidic luminophore have temperature maxima of greater than 100° C., particularly preferably in the range from 120° C. to 150° C. They therefore differ clearly from the determined glow curves of conventional ACPEL luminophores, which are used for example in thick film electroluminescent displays and were measured for the temperature maxima in the range from 30° C. to 70° C. Traps, which are responsible for the occurrence of glow peaks in the last-mentioned temperature range, can be emptied comparatively quickly, for example by fluctuations in the room temperature or else as a consequence of other factors and mechanisms and therefore rather give occasion for the occurrence of time limited, so-called afterglow processes, for which the term phosphorescence is also used as an alternative in the literature.

By contrast, the described zinc-sulphidic luminophore is able to securely store portions of the excitation radiation over a relatively long period of time, so that the reading out of the stored information in the form of a reproducible, exclusive glow curve, which takes place under defined conditions due to the addition of thermal energy, can be used as an additional authenticity criterion for the presence of the security feature according to the invention.

The filling of the traps which are responsible for the exclusive thermoluminescence characteristics of the described zinc-sulphidic luminophore preferably takes place by means of excitation with ultraviolet radiation. The optimum wavelength for the UV irradiation can be determined experimentally by measurement of the TSL excitation spectra. It was found that the wavelength of the excitatory UV radiation for the described zinc-sulphidic luminophore preferably lies in the range of less than/equal to 340 nm, in order to be able to achieve the highest possible signal strengths during reading out of the thermoluminescence.

A further finding relates to the emission spectrum of the second luminescence radiation, namely the thermally or else optically stimulated luminescence of the luminophore in the security feature according to the invention. In contrast to the deep red stationary electroluminescence, this emission spectrum has emission bands positioned in the green spectral range with maxima in the range from 520 nm to 550 nm.

The fact to be highlighted as a particularly important result of the many and diverse investigations that were carried out is that it was possible in the context of the invention to prove experimentally that the verification of the exclusive thermoluminescence signals of the security feature according to the invention can also take place securely on the documents of value and security documents, which are equipped with the correspondingly configured security features, such as for example banknotes, identity cards, passports and driving licences, or else bank or credit cards. In this case, it was at the same time also possible to show that all relevant substrate materials that are used for the creation of the respective documents of value and security documents withstand, without damage, the thermal treatment up to temperatures of 250° C. which is required for the repeated reading out of the TSL signals. It was in no way possible to determine damage to these materials and the designs and security features of different types that were placed on and in them. It was furthermore also possible to prove the thermal resistance of the various substrate materials in the temperature range relevant for the thermoluminescence measurements with the aid of thermoanalytic investigation methods.

Furthermore, the investigations on conventionally used bank note substrates, which were coated with security features according to the invention for the purposes of investigation, established that during repeated filling and reading out of the traps responsible for the exclusive thermoluminescence of the features, it is possible to measure glow curves which are distinguished by sufficiently high luminescence intensities and, with respect to the curve shape and the characteristic $T_{max}$ values, do not differ from the curves measured on powder samples of the described luminophore.

For the reproducible recording of the characteristic glow curves, it is in addition recommended, albeit not absolutely necessary, first to remove the energies randomly stored in the luminophore in the course of its use, for example due to daylight excitation, by targeted heating prior to the start of the measurement. Then, renewed excitation takes place under defined conditions.

The emptying of the special traps of the described zinc-sulphidic luminophore, which emptying is connected with the described luminescence effects, can also take place without the addition of thermal energy by means of targeted optical stimulation (OSL). In this case, the optical stimulation should take place with the aid of suitable lasers, in order to achieve sufficiently high and reliably detectable signal strengths. The stimulation wavelengths required for the efficient optical stimulation of the captured charge carriers can be determined experimentally.

In contrast to the glow curves that are typical for the thermoluminescence, characteristic decay curves are generally measured for the optically stimulated luminescence and recorded as authentication feature. As the investigations carried out in this summary established, a particularly beneficial signal/noise ratio can for example be achieved in the case of the optical stimulation of the energies that are stored by the zinc-sulphidic luminophore after 340 nm excitation has taken place if the stimulation wavelength of the laser is approximately 750 nm.

As the emission maximum of the optically stimulated luminescence of the described zinc-sulphidic luminophore, as in the case of its thermoluminescence, lies in the green spectral range between 520 nm and 550 nm, this type of radiation conversion may also be considered anti-Stokes luminescence.

In particular, the additional incorporation of cobalt ions into the ZnS:Cu matrix leads to an increase of the efficiency of the different characteristic luminescence processes of the luminophore for stabilizing the electroluminescence that takes place in the deep red spectral range and for reliable positioning of the temperature maxima of the thermoluminescence glow curves in the range between 120° C. and 150° C. that is aimed for.

The exclusive TSL or OSL characteristics of the zinc-sulphidic luminophore, which are based on the storage of the excitation energies, can be used as additional authenticity criteria for the authentication of documents of value and security documents. This means that they can also be called upon for example instead of the high security feature “electroluminescence” for authenticity verification, specifically if technical circumstances, environmental regulations or else safety regulations do not permit the realization of the required excitation of the electroluminescence pigments with high-frequency electric high voltage AC fields for demonstrating the exclusive electroluminescence of the security feature according to the invention.

Likewise, it is possible to use the additional exclusive TSL or OSL features in the case of failure or in the case of blocking of the energy transfer mechanisms required for the detection of the electroluminescence or in the event of suspected forgeries to evaluate the authenticity of the corresponding documents of value and security documents.

In this case, the test for the presence of the features can take place both forensically using appropriate technical auxiliary means in the laboratory or else also by machine, for example with the aid of correspondingly configured banknote testers.

It was already noted that a decisive prerequisite for the manifestation of the exclusive luminescence properties of the security feature according to the invention consists in the synthesized luminescent particles having both cubic and hexagonal phase fractions in each case.

In this case, the different phase fractions of the zinc-sulphidic luminophore obtained under special preparation conditions are apparently structurally connected with one another in the sense of the occurrence of possible epitaxial growth or intergrowth, which can be concluded from the fact that, unlike in the case of the mechanical mixing of for example purely cubic phase and purely hexagonal phase copper-activated ZnS particles, the correspondingly configured luminescent particles are characterized by uniform luminescence characteristics. Comprehensive investigations into the relationships between the structural status of the luminophore samples, which is determined with the aid of x-ray diffractometric methods, and the luminophore properties have established that both the emission spectra of the electroluminescence of the luminophores and the position of the temperature maxima of the exclusive TSL glow curves and also the characteristic shape of the decay curves of the optically stimulated luminescence depend to a considerable degree on the extent of the hexagonal phase fractions. In this context, it was possible to determine that the relative hexagonal phase fractions in the individual particles of the zinc-sulphidic luminophore are preferably on average greater than 10%, further preferably on average greater than 20% and particularly preferably on average lie in the range between 20% and 40%, in order to ensure that these particles have an electroluminescence which takes place in the deep red spectral range and at the same time have distinguishable exclusive thermoluminescence glow curves with temperature maxima in the range from 120° C. to 150° C.

For the production of the described zinc-sulphidic luminophore, first the multistage synthesis method known from the prior art is used. In order to be able to preparatively configure the cubic-hexagonal phase structure of the ZnS luminescent particles, which is to be considered as a prerequisite for the realization of the exclusive luminescence properties that are aimed for, the preparation conditions should be configured in a specific way, however. In this case, it has been shown that above all the thermal processes of the production methods are important for the formation of this special crystalline structure. These relate primarily to the high-temperature annealing process and the design of the subsequent cooling regime and also the tempering steps that are additionally performed for the most part in the course of the processing of the annealing material obtained.

As, according to references, the temperature for the phase transformation of the cubic sphalerite or zinc-blende structure to the hexagonal wurtzite structure of the zinc sulphide is approximately 1,020° C., the high-temperature annealing of the mixture of the starting materials for the luminophore synthesis, which is positioned in special crucibles in corresponding annealing furnaces, must take place significantly above this temperature in each case in order to enable the complete transformation of the starting materials and therefore initially the complete formation of hexagonal zinc-sulphidic luminescent particles.

A slow cooling of the annealing material would promote the reverse transformation of the hexagonal ZnS pigments formed at the high temperatures to the thermodynamically predetermined cubic crystalline structure. By contrast, only by rapid cooling can the hexagonal structural disposition of the crystallite be retained at least proportionally.

It has been shown that to realize the exclusive luminescence properties of the zinc-sulphidic luminophore that can be used for the security feature according to the invention, annealing temperatures in the range between 1,100° C. and 1,300° C., preferably above 1,200°° C. are required.

In order to ensure that hexagonal structural fractions of preferably 20% to 40% are still retained by means of rapid cooling of the synthesized luminescent particles after completion of the cooling process, it is helpful to optimize the cooling process and to determine measures for realizing the required cooling rate. In this case, the optimum constellation between the annealing temperature and the cooling regime depends on numerous factors. These factors include for example the type of the starting materials used for the synthesis of the zinc-sulphidic luminophores, the type of batch preparation, but also further technological aspects such as for example the furnace geometry, the furnace atmosphere, the type of crucible, the crucible size, etc. A person skilled in the art is able however, upon considering the technical circumstances and on the basis of the optimization experiments that have been carried out, to configure the cooling regime such that the synthesized luminescent particles ultimately have the desired hexagonal phase fractions.

It is also noted at this point that with respect to the circumstances described, there are large differences between the synthesis of relevant samples of luminophore at laboratory scale and the production of corresponding production batches taking place under industrial conditions. The determination of the cubic-hexagonal phase fractions of the annealing products that result in each case, which is necessary for the optimization of the annealing and cooling processes, can, as mentioned previously, be carried out with the aid of x-ray diffractometric measurements.

In principle, the tempering steps that are generally performed must also be included in the special configuration of the thermal processes used for producing the luminophore.

The repeated tempering of the processed annealing products takes place for the most part in two separate steps at temperatures which are significantly below the characteristic temperature for the cubic-hexagonal phase transformation of the zinc sulphide. They are carried out in order to partially anneal the lattice defects that are generally created in an uncontrolled manner as a consequence of the mechanical (grinding and screening process) and chemical (etching processes using mineral acids such as HCl and HNO3) stress of the synthesized luminophore, so as to be able to improve the efficiency of the resulting luminescence processes.

However, it should be taken into account in this case that a longer thermal treatment, for example at temperatures between 200° C. and 900° C. in the case of the zinc-sulphidic luminophore synthesized under special conditions, evidently leads to a reverse transformation of the intentionally created hexagonal structural fractions in favour of the formation of a preferably cubic crystal symmetry of the luminescent particles.

The security document and/or document of value according to the invention may for example be a banknote or a passport, an identity card, a driving licence, a postage stamp, tax banderols or else service cards, such as bank or credit cards. The security document and/or document of value has the security feature according to the invention. Preferably, the security document and/or document of value has one or more embodiments of the security feature according to the invention. The security feature is applied into and/or onto the security document or document of value with the aid of a printing technology, for example a gravure, offset or screen printing method, possibly also additionally with the aid of coating and laminating methods. The security document and/or document of value otherwise preferably also has features which are described in connection with the security feature according to the invention.

The security feature according to the invention furthermore additionally comprises field displacement elements. The field displacement elements are electrically conductive and electrically insulated inside the security document or document of value. They have a high dielectric constant. The field displacement elements preferably consist of metallic particles, such as iron (Fe), copper (Cu), aluminium (Al) and/or silver (Ag) or else also transparent, optically variable multilayer effect pigments. The field displacement elements are used for increasing the local field strength of the electric field acting on the zinc-sulphidic luminophore.

The field displacement elements are included together with the zinc-sulphidic luminophore in a mixture which is applied onto the security document and/or document of value by means of a printing technology, for example a gravure, offset or screen printing method. Here, the mixture may first be applied by means of a printing technology onto a substrate which is subsequently applied onto the security document and/or document of value, for example with the aid of coating and laminating methods.

As first a mixture having the field displacement elements and the zinc-sulphidic luminophore is produced and this is then applied onto the security document and/or document of value, an advantageous arrangement of the field displacement elements is created in close proximity to the zinc-sulphidic luminescent particles. In particular, due to a thorough mixing of the field displacement elements and the zinc-sulphidic luminescent particles, which takes place first, a regular arrangement in the security feature results, particularly both at the surface and at depth, so that the field displacement elements can contribute to an increase of the local field strength of the electric field acting on the zinc-sulphidic luminophore in a particularly advantageous manner.

The mixture may furthermore have a viscosity-determining element. For example, the viscosity-determining element may be a binder. In particular, the mixture may be a printing means, for example a printing dye or printing ink, which is applied onto the security document and/or document of value by means of a printing technology. Here, the printing means can be adapted to the printing technology used, particularly regarding the processing properties of the printing means to the printing technology.

The viscosity-determining element and/or possible further constituents of the mixture may remain in the security element after the application of the mixture and in particular be arranged here between the field displacement elements and the zinc-sulphidic luminescent particles. For example, a spacing can thereby be set between the field displacement elements and the zinc-sulphidic luminescent particles, particularly also with regards to an advantageous increase of the local field strength of the electric field acting on the zinc-sulphidic luminophore.

A viscosity of the mixture can be adapted to the printing technology used. The viscosity of the mixture can be determined in accordance with DIN 53211 using a viscosity flow cup or immersion flow cup having a 4 mm bore in particular (DIN 4 mm flow cup). In an exemplary embodiment, the mixture has a viscosity which, during a measurement according to DIN 53211, means that after immersion of an immersion flow cup into the mixture and pulling out the immersion flow cup, a liquid filament emanating from the immersion flow cup breaks off after a time of between 62 seconds and 72 seconds.

In a preferred embodiment, the mixture of the proportion of field displacement elements is higher than the proportion of zinc-sulphidic luminescent particles. In particular, a proportion by mass and/or volume of field displacement elements in the mixture may be higher than a corresponding proportion of zinc-sulphidic luminescent particles.

The security feature preferably has a high processing stability and high ageing resistance with respect to environmental influences. The stability and the ageing resistance are necessary for ensuring a secure verifiability of the security feature over the entire life cycle of the security document.

A further subject of the invention forms a method for detecting and/or verifying the security feature according to the invention in a security document or document of value. The method is preferably designed for detecting and/or verifying one of the described embodiments of the security feature according to the invention.

In this case, a first section of the method relates to the detection of the characteristic electroluminescence of the zinc-sulphidic electroluminophore used for forming the security feature according to the invention. To this end, in a first step, the security feature placed on or in a security document or document of value is excited by an electric AC field, preferably by a high-frequency high voltage AC field which has an AC voltage of 30 kV and a frequency of 30 kHz for example. Using suitable optical sensors, it is tested in a second step whether an electroluminescence of the security feature occurs and whether this electroluminescence is characterized by a first luminescence radiation in the deep red spectral range between 580 and 780 nm. This test can take place by means of the direct measurement of the emission spectrum of the luminophore or else by means of the verification of authenticity parameters which can be calculated on the basis of this spectrum. By using an electric AC field equipped with a high frequency as excitation source for the electroluminescence, the possibility is advantageously created at the same time to detect the luminescence signals necessary for evaluating authenticity at high read out rates.

A second section of the method according to the invention relates to the verification of the characteristic thermoluminescence (TSL) or the characteristic optically stimulated luminescence (OSL) of the security feature. To this end, in a first step of this second section, the traps responsible for the thermoluminescence or optically stimulated luminescence are filled by means of the excitation with a UV radiation of selected wavelength, preferably in the range ≤340 nm. In a second step of this section, the reading out of the energies stored in the traps takes place by means of thermal or optical stimulation.

In one embodiment of the method, which uses thermal stimulation, this takes place by means of targeted heating of the security feature, preferably up to a temperature of maximum 250° C. In a third step, the test takes place as to whether a second luminescence radiation is emitted as a consequence of the thermal stimulation.

In the case of the thermal stimulation, the TSL glow curve of the luminophore with temperature maxima of greater than 100° C. and particularly preferably in the range from 120° C. to 150° C., which is characteristic for the feature, can be recorded for the purpose of authenticity verification. This glow curve characterizes the dependence of the integral intensities of the thermoluminescence signals that are read out on the baking temperature.

A further increase of the detection security can be achieved in that in parallel with or in addition to the measurement of the glow curve, the emission spectrum of the thermoluminescence is also included in the authenticity evaluation of the security feature. This emission spectrum, i.e. that of the second luminescence radiation, preferably has an emission band positioned in the green spectral range between 520 nm and 550 nm.

According to a modified embodiment of the method for detecting and/or verifying the security feature, the optically stimulated luminescence (OSL) is measured and evaluated as an alternative to thermoluminescence. Also in this embodiment, in a first step of the second method section, the lattice traps of the luminophore are initially filled preferably by means of the excitation with the aid of a UV-B radiation of less than/equal to 340 nm, the subsequent emptying of the traps, which forms the second step, than takes place however, unlike the thermoluminescence, not by means of thermal, but rather by means of a targeted optical stimulation of the luminophore. Investigations established that a particularly beneficial signal/noise ratio can be achieved in the case of authenticity verification in this sense in particular if the stimulation wavelength of the laser used for the purpose of optical stimulation is approximately 750 nm.

In contrast to the glow curves typical for the thermoluminescence, the optically stimulated luminescence according to this third step of this method section delivers a characteristic decay curve as authentication feature. The spectral distribution of the radiation emitted following the optical stimulation however corresponds to that which is characteristic for the emission spectrum of the thermoluminescence.

To ensure a high reproducibility during the detection of the luminescence characteristics based on the described storage processes, that is to say both the thermoluminescence and the optically stimulated luminescence, it is advantageous initially to heat the security feature, which comprises the zinc-sulphidic luminophore, to approximately 250° C. prior to the start of the excitation and testing steps, in order in this manner to remove energies randomly stored in the traps for example due to a corresponding daylight excitation.

Furthermore, it is advantageous to keep a pause of a few seconds between the UV excitation that has taken place and the start of the thermal or optical stimulation of the energies or charge carriers stored in the traps, in order in this manner to enable the decay of phosphorescence processes that may possibly occur.

The described different phases of the detection method can be performed successively or as an alternative to one another, i.e. first the occurrence of the first luminescence radiation and then the occurrence of the second luminescence radiation can be tested. Likewise, the aforementioned method steps can be carried out separately from one another in terms of time and space.

In this case, the method phase for verifying the electroluminescence (first luminescence radiation) has the advantage that it can also be performed as a method for high-speed detection of security features and therefore can for example also be used in corresponding banknote sorting systems.

The method phases which are to be performed alternatively for detecting the TSL or OSL characteristics are by contrast used in particular if technical circumstances, environmental regulations or else safety regulations do not permit the testing of the electroluminescence of the security features using high-frequency electric high voltage AC fields.

The additional testing of a second luminescence radiation, which testing is based on the storage functionality of the luminophore used in the security feature according to the invention, leads to a further increase of the forgery protection of the corresponding documents of value and security documents. As a result, it is possible to prove the authenticity of these documents also in the case of questionable or unclear results during the detection of the electroluminescence or else in the case of suspected forgeries.

In this case, the verification of the TSL signals both forensically in the laboratory or else also by machine, in spite of the time spent in connection with the required baking of the features, for example with the aid of correspondingly configured banknote testers.

Machine readability for the optically stimulated luminescence exists anyway, because the processes required for the measurement of the OSL signals proceed at a clearly higher rate.

DESCRIPTION OF EXEMPLARY EMBODIMENTS

Figure 2:
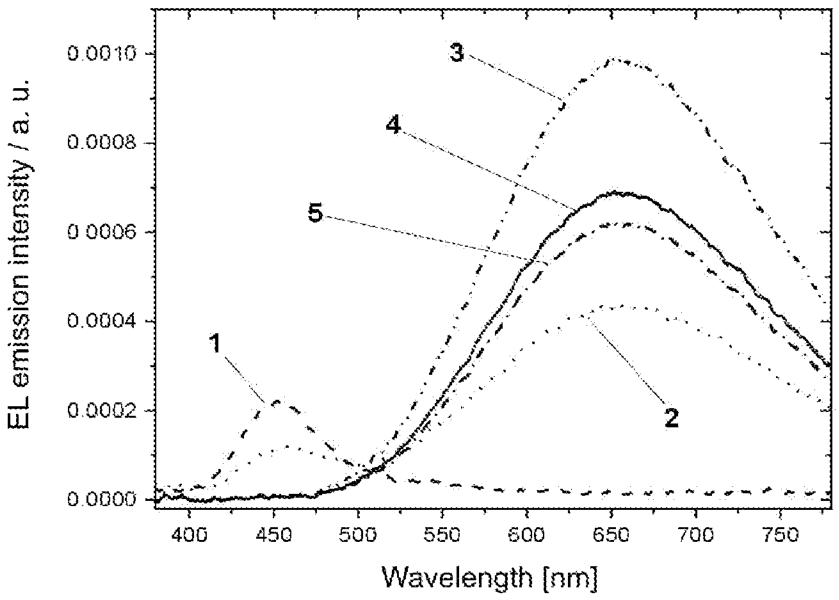
Figure 3:
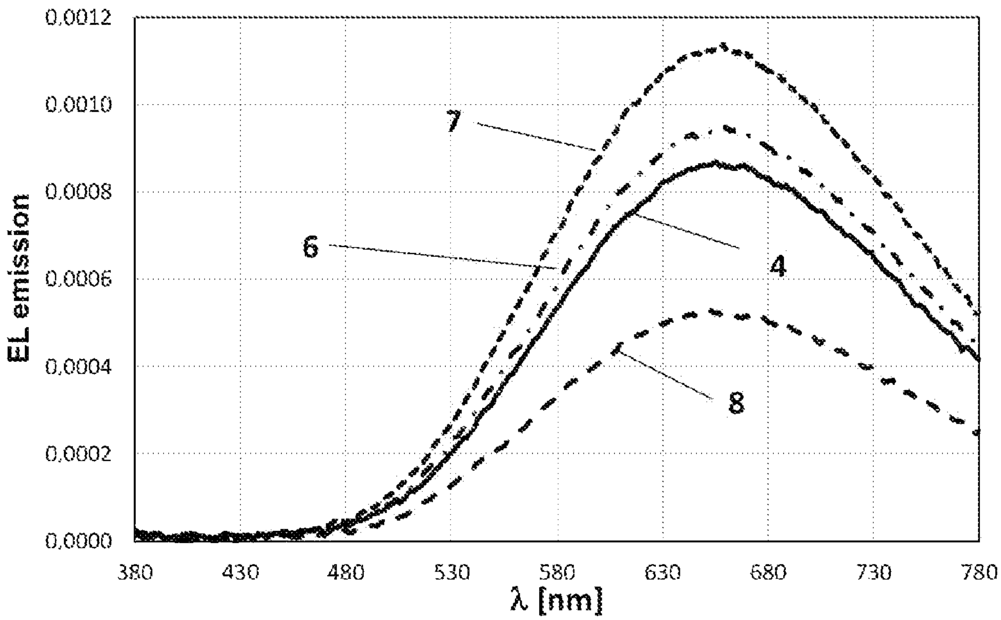
Figure 4:
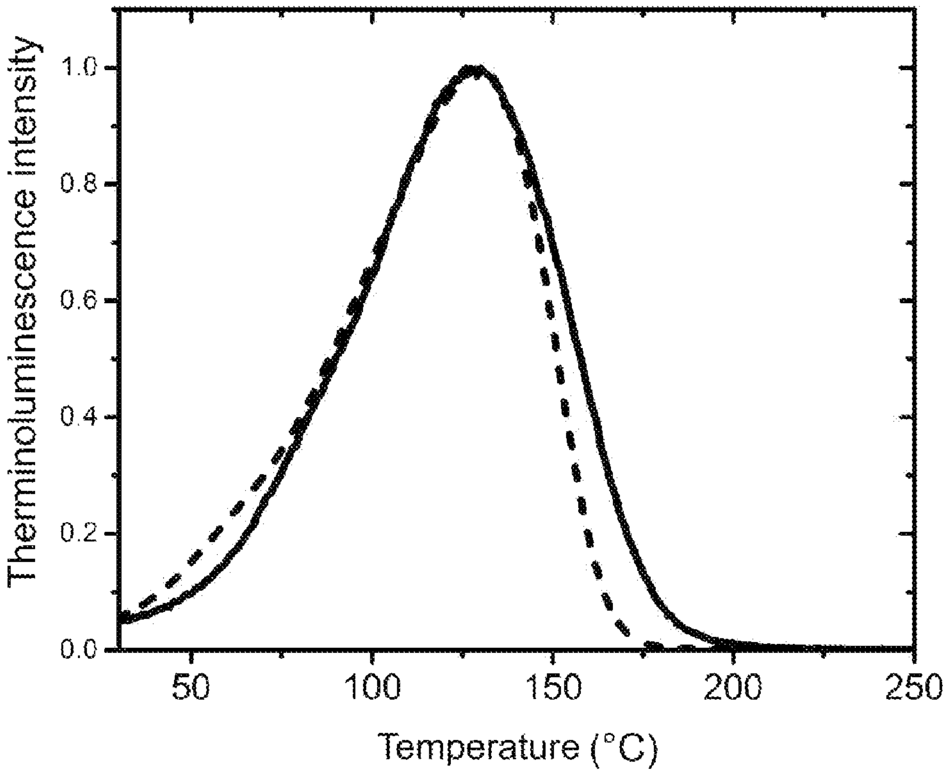
Figure 5:
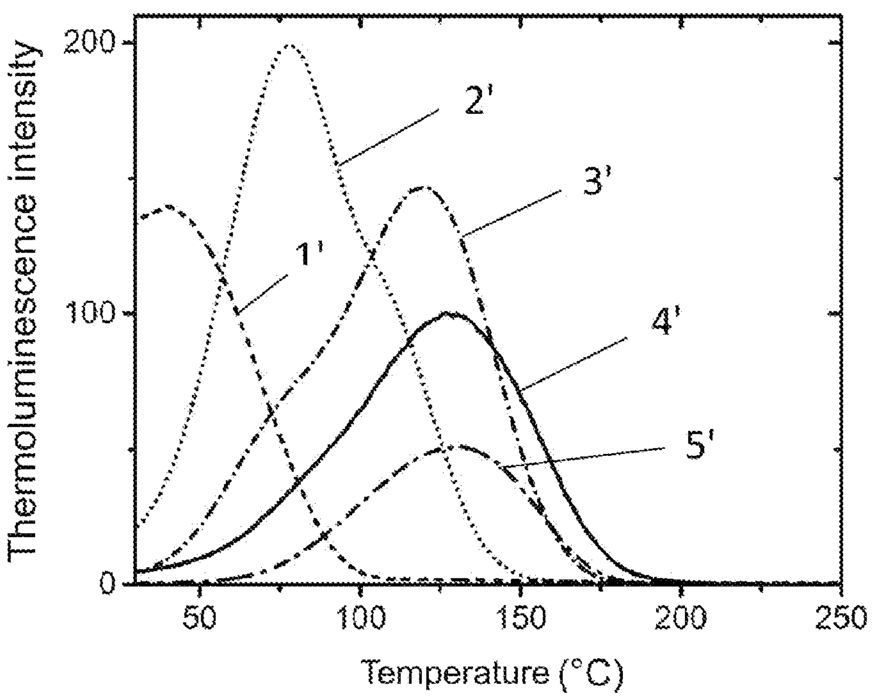
Figure 6:
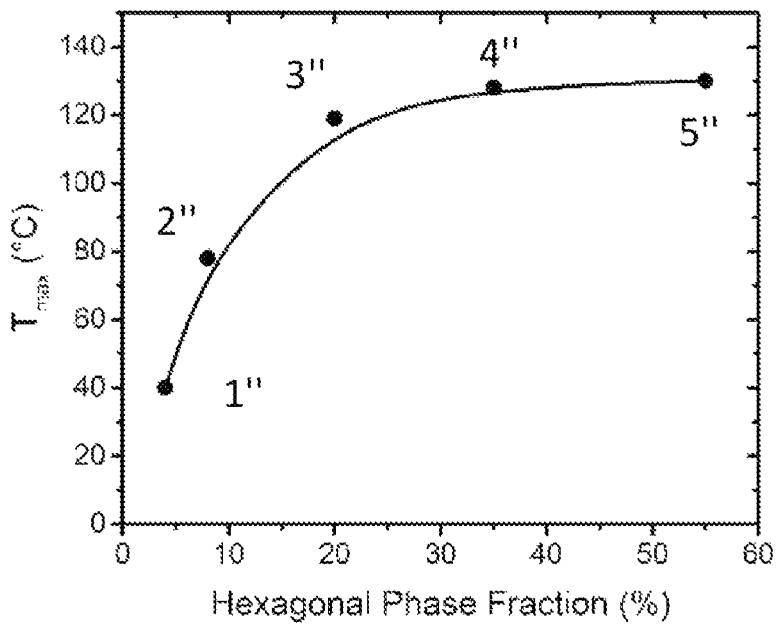
Figure 7:
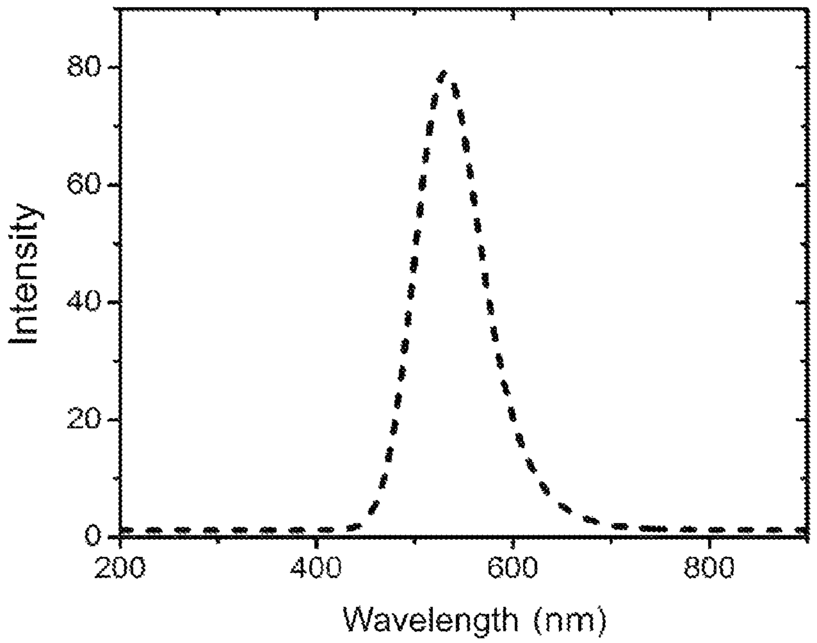
Figure 8:
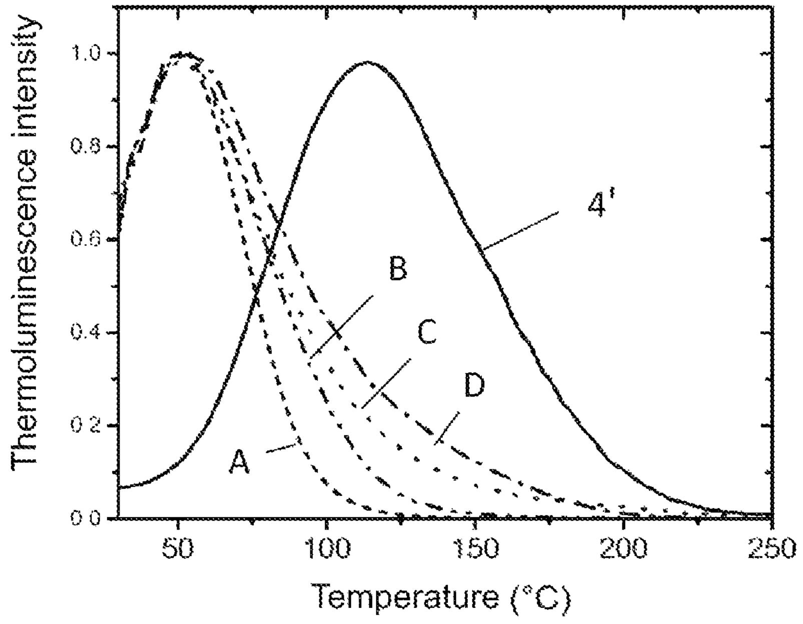
Figure 9:
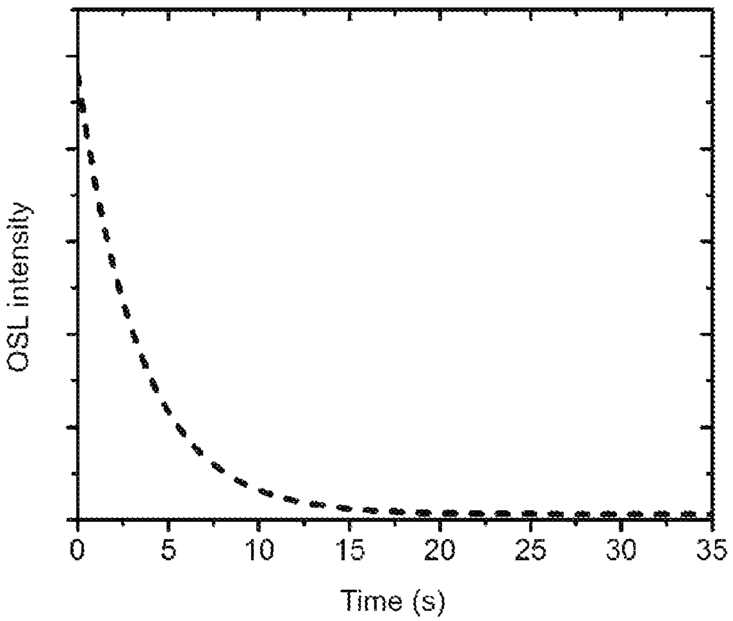
Figure 10:
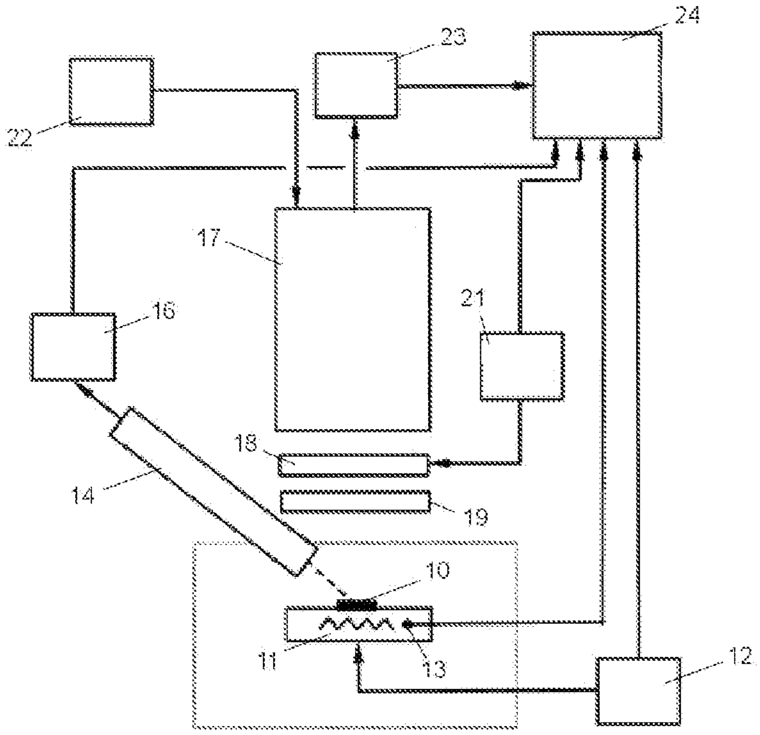

Further details, advantages and special manifestations of the invention are explained in more detail in the following with reference to preferred embodiments of the invention, with reference to the drawing. In the figures:

FIG. 1: shows an x-ray diffraction diagram of a zinc-sulphidic luminophore, which is also termed a reference luminophore in the following;

FIG. 2: shows electroluminescence emission spectra of selected zinc-sulphidic luminophores which are activated with copper exclusively;

FIG. 3: shows electroluminescence emission spectra of embodiments according to the invention of the zinc-sulphidic luminophore, which are additionally doped with cobalt;

FIG. 4: shows thermoluminescence glow curves of the zinc-sulphidic reference luminophore and a security feature comprising this luminophore;

FIG. 5: TSL glow curves of selected variants of the zinc-sulphidic luminophore with different hexagonal phase fractions;

FIG. 6: shows a relationship between the temperature maxima of the TSL glow curves shown in FIG. 5 and the hexagonal phase fractions of the different variants of the zinc-sulphidic luminophore;

FIG. 7: shows a thermoluminescence emission spectrum of a security feature;

FIG. 8: shows the TSL glow curve of the zinc-sulphidic reference luminophore compared to TSL glow curves of electroluminescence luminophores according to the prior art;

FIG. 9: shows a characteristic decay curve for an optically stimulated luminescence of a security feature; and FIG. 10: shows a schematic illustration of an optical arrangement for measuring the spectra and curves shown in FIG. 4 to FIG. 9.

FIG. 1 shows an x-ray diffraction diagram of a zinc-sulphidic luminophore (reference luminophore) of a security feature. Here, the reference luminophore used is a zinc-sulphidic luminophore which is activated with copper exclusively. In the following, the synthesis of this luminophore with the composition $ZnS:Cu_{0.0005}$ that is aimed for is explained by way of example.

To produce the luminophore, 399.3 g of a high-purity powdered zinc sulphide are mixed intensively with 0.25 g of previously ground $CuSO_4$ and screened by means of a 100 μm screen to improve the homogeneity of the mixture further. Subsequently, the batch mixture is transferred to a corundum crucible and heated to 1,200° C. in a chamber furnace with a rate of 15 K/min. After high-temperature annealing for three hours in a forming gas atmosphere with a hydrogen content of 5%, the furnace is cooled to 600° C. within 90 min. The annealing material is removed and cooled in air to room temperature. This is followed by wet grinding, an etching step using dilute nitric acid and a one-off washing process. Subsequently, the solids obtained are separated by means of filtration and once again mixed with 4 ml of a copper sulphate solution (16 g $CuSO_4$ per litre) for the purpose of redoping. After repeated intensive homogenization, the material mixing is subsequently tempered during tempering at 500° C. for 180 min. The final processing steps comprise renewed wet grinding, which is required for setting the desired grain size distribution of the synthesized luminescent particles, and the subsequent final washing, drying and screening processes.

The x-ray diffraction diagram of the reference luminophore, which was measured with the aid of a diffractometer, is illustrated in FIG. 1. It consists of numerous linear interferences, which can in each case be assigned to the two different, cubic and hexagonal structural types of the zinc sulphide however. In this case, the peaks provided with the letters h and the respective Miller indices which are placed in brackets represent the hexagonal phase of the powdered luminophore sample, whilst the reflexes marked with the letter k and the Miller indices relevant in this case represent the proportional cubic crystalline structure of the sample. Overlays of hexagonal and cubic interferences were labelled by the letter combination h+k.

On the basis of the measured diffractogram and the quantitative phase analysis based thereon, it was possible for the structural status of the reference luminophore to determine relative phase fractions of 35% for the hexagonal and 65% for the cubic crystalline structure.

The extent of the relative structural phase fractions in the luminophore is influenced to a large extent by, in addition to other factors, the preparation conditions used during the production of the luminophore. However, that also means that the corresponding structural status of the luminophore samples can be modified by changing certain synthesis parameters. This can be drawn by way of example from the following table, in which important data for the characterization of the synthesis conditions and the structure and luminescence properties of selected copper doped zinc-sulphidic luminophores are compiled:

| | Main annealing process | | Hexagonal phase | Electro-luminescence | | Thermo-luminescence | |
|---|---|---|---|---|---|---|---|
| Luminophore | T/° C. | $t_{down}$/ min | fraction % | $\lambda_{max}$/ nm | Int./ % | $T_{max}$/ % | Int./ % |
| Luminophore 1 | 1,100 | 140 | 4 | ≈460 | 10 | 40 | 98 |
| Luminophore 2 | 1,100 | 120 | 8 | ≈650 | 66 | 78 | 190 |
| Luminophore 3 | 1,200 | 120 | 20 | ≈650 | 143 | 120 | 160 |
| Reference luminophore Luminophore 4 | 1,200 | 90 | 35 | ≈650 | 100 | 128 | 100 |
| Luminophore 5 | 1,200 | 40 | 55 | ≈650 | 90 | 130 | 45 |

In the preceding table, the data for the electroluminescence properties and to the thermoluminescence properties relate on the one hand to the wavelength maximum $\lambda_{max}$ of the corresponding EL emission spectrum in each case and on the other hand to the temperature maximum $T_{max}$ of the thermoluminescence glow curve recorded for the respective luminophore under comparable conditions. The listed data for the percentage intensities relate to the corresponding measured values that were determined for the reference luminophore, which were set at 100 in each case.

It is to be highlighted that all of the luminophores listed in the table—except for the differences explained specifically here—have the same luminophore composition and that they were all manufactured on the basis of the above-described method under predominantly identical production conditions, i.e. the same form of the batch preparation, the same crucible and furnace geometry, identical annealing time and annealing atmosphere and also comparability of all mechanical and thermal aftertreatment steps. To acquire the different phase compositions by contrast, both the temperatures of the main annealing process and the cooling rates were varied.

As can be drawn from the table, the high-temperature annealings of the batch mixtures for three hours in each case were carried out at temperatures of 1,100° C. or 1,200° C. The characteristic values listed in the table for the different cooling rates $t_{down}$ that are set relate to the time intervals between the completion of the main annealing process and the respective achievement of a cooling temperature of 600° C.

Depending on the variations of the preparation conditions which are undertaken, relative hexagonal phase fractions in the range from 4% to 55% were obtained for the resulting zinc-sulphidic luminophores.

FIG. 2 shows the emission spectra resulting during the excitation of the luminophore samples listed in the above table with an electric AC field. The high voltage AC field has an excitation voltage 30 kV and an excitation frequency of 30 kHz. It emerges from the electroluminescence emission spectra that the luminophore samples, which were produced at comparatively low annealing temperatures and low cooling rates and which for this reason have comparatively low hexagonal structural fractions are characterized, as in the case of luminophore sample 1 (emission spectrum 1), by an exclusively blue electroluminescence or else, as in the case of luminophore sample 2 (emission curve 2), by a blue electroluminescence which is still present at least proportionally.

As the emission curves 3, 4 and 5 of FIG. 2 show, exceptionally wide-banded emissions in the deep red spectral range with intensity maxima in the region of 650 nm, which are preferred for the formation of the security features according to the invention, clearly dominate from a relative hexagonal phase fraction of approximately 10% and in particular from a relative hexagonal phase fraction of approximately 20%. The intensities of the measured electroluminescences clearly increase up to a hexagonal phase fraction of approximately 20%, in order thereafter to decrease slightly in the case of an even greater extent of the hexagonal structural characteristics.

FIG. 3 shows electroluminescence emission spectra 6 to 8 of zinc-sulphidic luminophores according to the invention, wherein these luminophores have an additional cobalt co-doping in addition to the copper activation. For the purposes of comparison, the emission curve 4 of the reference luminophore, which is doped exclusively with copper, was also recorded in FIG. 3. It also emerges from FIG. 3 that the additional incorporation of cobalt ions in the copper-doped ZnS fundamental lattice of the zinc-sulphidic luminophore enables an increase of the efficiency of the electroluminescence and a further stabilization of the special emission characteristics.

In this case, the production of the co-doped luminophore samples according to the invention (emission curves 6 to 8) under the same conditions, as were also used for the synthesis of the reference luminophore, which is activated exclusively with copper (emission curve 4). As in the case of the reference luminophore, uniform values of 500 ppm were also in turn set for the molar fractions of the copper activator ions, whilst for the molar fractions of the cobalt ions, values of 5 ppm (emission curve 6), 10 ppm (emission curve 7) or 20 ppm (emission curve 8) were determined.

FIG. 4 shows a comparison of the exclusive thermoluminescence glow curves which were determined for the powdered reference luminophore and a security feature having this reference luminophore, wherein this security feature was positioned on a banknote substrate. In this comparison, the thermoluminescence glow curve of the powdered reference luminophore is illustrated with a continuous line, whilst the thermoluminescence glow curve of the security feature is illustrated with a dashed line.

In both cases, the samples to be tested were first heated to 250° C., in order to be able to remove energies stored randomly in this manner, possibly by means of a corresponding day-light excitation. This primary baking procedure, which aims to secure a high reproducibility of the subsequent standard TSL measurements or OSL measurements, was used in all investigations relating to this.

After the cooling has taken place, the samples prepared in such a manner, were excited under defined conditions with the aid of a 340 nm laser, in order to effect as complete as possible a filling of the traps responsible for the thermoluminescence of the samples. After that, in all cases, a pause of 20 seconds was complied with, in order subsequently to start with the reading out of the stored light sums by means of targeted heating of the samples using a heating rate of 5 K/s up to a final temperature of 250° C. The integral intensities of the radiation emitted by the samples as a consequence of the supplied thermal energy could be detected with the aid of a TSL/OSL reader of the company RISØ (Model DA-15). The graphical representation of its temperature dependence leads to the curves shown in FIG. 4.

It becomes clear that the two curves have practically the same temperature maxima at approximately 130° C. and that they also differ from one another only slightly with regards to the curve shape. This means that the exclusive thermoluminescence characteristics of the luminophore are also retained if the luminophore is processed to form the security feature, particularly if it is applied onto and/or into corresponding documents of value and security documents, such as for example banknotes, identity cards, passports and driving licences, or else also bank or credit cards.

The two thermoluminescence glow curves shown are glow curves standardized in terms of intensity. The differences with respect to the measured intensities are comparatively small however. In the case of otherwise identical measuring conditions, the intensities of the thermoluminescence signals measured for one and the same luminophore depend on the thickness of the respective luminophore layer.

In the comprehensive investigations carried out in this context, it was furthermore possible to show that the exclusive TSL signals as well as possibly the signals for the optically stimulated luminescence of the luminophore of the security feature according to the invention can also be securely verified in the case of the solid concentrations which are to be considered typical for security inks which contain pigment and the print designs obtained using these inks.

Likewise, reference is made once more at this point that it was also possible to ensure in these investigations that all substrate materials usually used for the creation of documents of value and security documents have a sufficiently high stability in order to withstand the thermal treatment up to temperatures of 250° C. required for the repeated reading out of the thermoluminescence signals without damaging these materials and the security features placed onto and into them.

The security feature comprises a mixture, which is applied by means of a printing technology onto a security document or document of value, made up of field displacement elements, which are electrically conductive and electrically insulated inside the security document or document of value, and a zinc-sulphidic luminophore 6, 7, 8 according to the invention in the form of particles.

The mixture comprising the field displacement elements and the zinc-sulphidic luminophore 6, 7, 8 according to the invention can for example be applied onto the security document and/or document of value by means of a gravure, offset or screen printing method.

The mixture may furthermore comprise an element which is decisive for the viscosity of the mixture, e.g. a binder. In particular, the mixture may be a printing means, for example a printing dye or printing ink, which is applied onto the security document and/or document of value by means of a printing technology. Here, the printing means, particularly the viscosity of the printing means, can be adapted to the printing technology used, particularly regarding the processing properties of the printing means to the printing technology.

FIG. 5 shows the TSL glow curves 1' to 5' of the zinc-sulphidic luminophores 1 to 5 described in the above table. In this case, the curves were not standardized, so that the intensity differences determined under the same measuring conditions are indicated.

Furthermore, it becomes clear that the temperature maxima of the glow curves of the investigated luminophores are displaced to higher temperatures under the influence of the increasing, preparatively set hexagonal phase fractions listed in the above table.

FIG. 6 shows a relationship between the temperature maxima $T_{max}$ of the TSL glow curves shown in FIG. 5 and the hexagonal phase fractions of the luminophores investigated. In this case, it is shown that for the temperature maxima of the glow curves, values in the preferred range of between 120° C. and 150° C. in the sense of the invention are first achieved from a hexagonal phase fraction of approximately 10%.

FIG. 7 shows a thermoluminescence emission spectrum which comprises the above-described reference luminophore (luminophore 4 in the table). Surprisingly, this thermoluminescence emission spectrum is, in contrast to the that for the stationary electroluminescence of the luminophore, characterized by a comparatively narrow-banded emission with an emission maximum of approximately 540 nm.

FIG. 8 once again shows the TSL glow curve of the reference luminophore compared to TSL glow curves of electroluminescence luminophores A, B, C, D according to the prior art, as are used for example in thick film electroluminescence displays. The reference luminophore has an electroluminescence in the deep red range of the electromagnetic spectrum. The electroluminescence luminophores B and D by contrast show an electroluminescence in the blue spectral range of visible light, whilst the luminophores A and C emit in the green range after excitation with the aid of electric AC fields. The previously known electroluminescence luminophores A-D are EL pigments of different manufacturers. All illustrated standardized TSL glow curves were measured under the same conditions.

In contrast to the characteristic thermoluminescence glow curve of the zinc-sulphidic reference luminophore, the glow curves of all electroluminescence luminophores A, B, C, D included in the comparison have temperature maxima which are settled only slightly above a temperature of 50° C. Differently from in the case of the zinc-sulphidic luminophore of the security feature according to the invention, the comparatively flat traps which are responsible for the occurrence of thermoluminescence effects in this low temperature range can already be emptied by means of the addition of relatively low energies without additional stimulation, that is to say for example even by means of corresponding fluctuations of the room temperature in the form of weak intensity afterglow processes.

The use of the zinc-sulphidic luminophore with phase relationships which are influenced in a targeted manner in the security feature according to the invention by contrast opens up the possibility of using the exclusive thermoluminescence characteristic as a stand-alone or additional criterion for the authenticity verification of the documents of value and security documents equipped with the security feature according to the invention.

Alternatively to the addition of thermal energy, the electrons stored in the characteristic lattice traps of the zinc-sulphidic luminophore of the security feature according to the invention after corresponding excitation can however, by means of a targeted optical stimulation, also be freed from the traps and returned to the electronic base state with emission of a corresponding luminescence radiation.

Unlike for the glow curves which are characteristic for the thermoluminescence, specific decay curves are measured for the optically stimulated luminescence, which can according to the invention likewise be used as an authenticity criterion.

FIG. 9 shows a characteristic decay curve for an optically stimulated luminescence of a security feature which comprises the above-described zinc-sulphidic reference luminophore, the thermoluminescence glow curve of which is shown in FIG. 4. The security feature is positioned on a banknote substrate. After the filling of the traps with renewed use of the 340 nm laser excitation source and keeping a corresponding pause of 20 seconds, the reading out of the stored light sum took place by means of the optical stimulation with the aid of an intensive 750 nm laser radiation. Orientation experiments that were carried out previously had shown that the largest signal/noise ratio can be achieved when using a laser wavelength of this type.

The spectral distribution of the light emitted after optical stimulation of the zinc-sulphidic luminophore of the security feature according to the invention matches that which was determined in the corresponding TSL measurements. Considering the wavelength maximum of this emission found at approximately 536 nm and the excitation wavelength of 750 nm, the radiation conversion as a consequence of the optical stimulation of the security feature according to the invention may be classified as anti-Stokes luminescence.

The exact shape of the decay curves resulting from the optical stimulation of luminophores is influenced by various factors, which also include the laser power. The decay curves measured under defined conditions represent exclusive luminophore characteristic curves however, which can be verified with high reliability at a high read out rate and without any thermal stressing of the security feature according to the invention.

FIG. 10 shows a schematic illustration of an optical arrangement for measuring the spectra and curves shown in FIG. 4 to FIG. 9. The zinc-sulphidic luminophore or the security feature forms a sample 10. The arrangement comprises a heating device 11, using which the sample 10 can be heated for the purpose of thermal stimulation. The heating device 11 can be controlled using a heating control 12. A thermocouple 13 is arranged on the heating device 11 in order to be able to measure the temperature generated by the heating device 11.

The arrangement additionally comprises a laser 14, using which the sample 10 can be optically excited. The laser 14 is tunable and controllable using a laser control 16. The laser 12 can also be used to fill the special lattice traps, which are responsible for the occurrence of the exclusive TSL or OSL effects of the security feature according to the invention, by means of excitation. During this excitation, the shutter 18 in front of the light detection device 17 remains closed. The optical filters 19 are selected such that the wavelengths emitted by the sample 10 in the case of the respective thermal or optical excitation can be measured with high efficiency, whilst all other wavelengths are blocked.

The arrangement furthermore comprises a light detection device 17 which may for example be formed by a photomultiplier tube. An optical shutter 18 and one or more optical filters 19 are arranged between the light detection device 17 and the sample 10. The shutter 18 is activated using a shutter control 21. A high-voltage unit 22 is used for supplying the light detection device 17 with a high voltage. An output signal of the light detection device 17 is amplified using an amplifier 23 and passed to a computer 24. The computer 24 is otherwise used for controlling the heating control 12, the shutter control 21 and the high-voltage unit 22. An output signal of the thermocouple 13 is likewise passed to the computer 24.

The features disclosed in the preceding description, the claims, and the drawing may be of significance both individually and in any desired combination for the implementation of the different embodiments.

REFERENCE LIST

1 Emission spectrum of the electroluminescence of a zinc-sulphidic luminophore 1 which is activated with copper exclusively
2 Emission spectrum of the electroluminescence of a zinc-sulphidic luminophore 2 which is activated with copper exclusively
3 Emission spectrum of the electroluminescence of a zinc-sulphidic luminophore 3 which is activated with copper exclusively
4 Emission spectrum of the electroluminescence of a zinc-sulphidic luminophore 4 (reference luminophore) which is activated with copper exclusively
5 Emission spectrum of the electroluminescence of a zinc-sulphidic luminophore 5 which is activated with copper exclusively
1' Thermoluminescence glow curve of the luminophore 1
2' Thermoluminescence glow curve of the luminophore 2
3' Thermoluminescence glow curve of the luminophore 3
4' Thermoluminescence glow curve of the luminophore 4 (reference luminophore)
5' Thermoluminescence glow curve of the luminophore 5
1" Temperature maximum of the glow curve of the luminophore 1
2" Temperature maximum of the glow curve of the luminophore 2
3" Temperature maximum of the glow curve of the luminophore 3
4" Temperature maximum of the glow curve of the luminophore 4 (reference luminophore)
5" Temperature maximum of the glow curve of the luminophore 5

6 Electroluminescence emission spectrum of a luminophore 6 which is additionally co-doped with 5 ppm cobalt
7 Electroluminescence emission spectrum of a luminophore 7 which is additionally co-doped with 10 ppm cobalt
8 Electroluminescence emission spectrum of a luminophore 8 which is additionally co-doped with 20 ppm cobalt
10 Sample
11 Heating device
12 Heating control
13 Thermocouple
14 Laser
15 -
16 Laser control
17 Light detection device
18 Optical shutter
19 Optical filter
20 -
21 Shutter control
22 High voltage unit
23 Amplifier
24 Computer

The invention claimed is:

1. A security feature for a security document and/or document of value, the security feature comprising a mixture, which is applied by means of a printing technology onto a security document and/or document of value, made up of field displacement elements, which are electrically conductive and electrically insulated inside the security document or document of value, and a zinc-sulphidic luminophore in the form of particles, the zinc-sulphidic luminophore having the following generic chemical formula:

$$ZnS: Cu_x, M_y, X_z$$

where:

M=one or more elements from a group comprising the chemical elements Co, In and Ni;

X=one or more elements from a group comprising the halides F, Cl, Br and I;

$0<x\leq 0.002$;

$0<y\leq 0.00015$; and $0\leq z\leq 0.00050$;

the particles case having cubic phase fractions and hexagonal phase fractions, the zinc-sulphidic luminophore emitting a first luminescence radiation in the spectral range between 580 nm and 780 nm upon excitation by an electric field, and the zinc-sulphidic luminophore emitting a second luminescence radiation in the visible spectral range upon thermal stimulation and preceding excitation by means of UV radiation.

2. The security feature according to claim 1, characterized in that the mixture furthermore has a viscosity-determining element.

3. The security feature according to claim 1, characterized in that the hexagonal phase fractions in the individual particles of the zinc-sulphidic luminophore on average lie in the range between 20% and 40%.

4. The security feature according to claim 1, characterized in that the first luminescence radiation has an emission spectrum which consists of an emission band in the deep red spectral range.

5. The security feature according to claim 1, characterized in that the second luminescence radiation is emitted in the green spectral range.

6. The security feature according to claim 1, characterized in that the second luminescence radiation has a maximum with a wavelength in the spectral range between 520 nm and 550 nm.

7. The security feature according to claim 1, characterized in that the second luminescence radiation emitted owing to the thermal stimulation has an integral intensity maximum (thermoluminescence glow curve) in the temperature range between 120° C. and 150° C.

8. The security feature according to claim 1, characterized in that the zinc-sulphidic luminophore also emits the second luminescence radiation when it is optically stimulated after preceding excitation.

9. The security feature according to claim 1, characterized in that the particles have an average grain size of between 2 μm and 50 μm, particularly between 2 μm and 20 μm.

10. The security feature according to claim 1, characterized in that the zinc-sulphidic luminophore has the following generic chemical formula:

$$ZnS: Cu_x, Co_y$$

where $0<x<0.002$ and $0<y\leq 0.00015$.

11. A security document and/or document of value having a security feature according to claim 1.

12. A method for detecting and/or verifying a security feature having a luminophore according to claim 1 in a security document and/or document of value, comprising the following steps:

a. exciting the luminophore (10) by means of an electric AC field;
b. testing whether, as a consequence of the excitation by means of the electric AC field in step a., a first luminescence radiation is emitted in the spectral range between 580 nm and 780 nm;
c. exciting the luminophore by means of a UV radiation;
d. stimulating the excited luminophore (10) by means of thermal stimulation or by means of optical stimulation of the luminophore; and
e. testing whether, as a consequence of the stimulation, a second luminescence radiation is emitted in the visible spectral range.

13. The method according to claim 12, characterized in that a confirmation signal is respectively generated if the occurrence of the tested first or second luminescence radiation is determined in one of the performed test steps b. and/or e.

14. The method according to claim 12, characterized in that the luminophore is heated to a temperature of up to a maximum of 250° C. for the thermal stimulation.

15. The method according to claim 12, characterized in that in the case of the thermal stimulation in step e., the intensity of the emitted second luminescence radiation is compared with a predetermined thermoluminescence glow curve.

16. The method according to claim 12, characterized in that in the case of the optical stimulation in step e., the intensity of the emitted second luminescence radiation is compared with a predetermined decay curve.

* * * * *